(12) United States Patent
Clark et al.

(10) Patent No.: US 8,746,318 B2
(45) Date of Patent: Jun. 10, 2014

(54) TIRE BEAD SEATING METHOD AND APPARATUS

(76) Inventors: Clinton Robert Clark, New Salisbury, IN (US); Charles Edward O'Connor, IV, Palmyra, IN (US)

( * ) Notice: Subject to any disclaimer, the term of this patent is extended or adjusted under 35 U.S.C. 154(b) by 559 days.

(21) Appl. No.: 13/048,130

(22) Filed: Mar. 15, 2011

(65) Prior Publication Data

US 2011/0220297 A1    Sep. 15, 2011

Related U.S. Application Data

(60) Provisional application No. 61/314,065, filed on Mar. 15, 2010.

(51) Int. Cl.
*B60C 25/128*    (2006.01)

(52) U.S. Cl.
USPC .............................. 157/1.28; 157/1; 157/1.17

(58) Field of Classification Search
USPC ........................................... 157/1, 1.17, 1.28
See application file for complete search history.

(56) References Cited

U.S. PATENT DOCUMENTS

| | | | | |
|---|---|---|---|---|
| 4,169,698 | A * | 10/1979 | Turk et al. | 425/58.1 |
| 6,076,586 | A * | 6/2000 | Hans | 157/1.17 |
| 6,557,610 | B2 * | 5/2003 | Koerner et al. | 157/1 |

OTHER PUBLICATIONS

Unknown, Load Simulator, catalog page, Dominion Technologies Group, Inc., www.dominiontec.com, USA, date unknown.
Unknown, Load Simulator, catalog sell sheet, Dominion Technologies Group, Inc., Roseville MI, date unknown.
Unknown, Load Simulator—Product Information & Options, http://www.cominiontec.com/template.php?pid=16, printed Feb. 22, 2011, c 2011.
Dominion Technologies, Inc. USA.

* cited by examiner

*Primary Examiner* — Lee D Wilson
*Assistant Examiner* — Shantese McDonald
(74) *Attorney, Agent, or Firm* — Anthony P. Filomena; Taft Stettinius & Hollister LLP

(57) ABSTRACT

A tire bead seating apparatus for seating tire beads on a vehicle wheel, the apparatus comprising: (a) a repositionable arm operatively coupled to a rotatable drum, the repositionable arm directing the rotatable drum into selective engagement with an inflated tire mounted to a vehicle wheel, the rotatable drum operative to rotate when engaging the inflated tire to rotate the inflated tire and the vehicle wheel; (b) a first set of rollers selectively contacting a first peripheral surface of the inflated tire, the first peripheral surface bridging between a first sidewall and a treaded surface of the inflated tire; (c) a first set of rollers selectively contacting a second peripheral surface of the inflated tire, the second peripheral surface bridging between a second sidewall and the treaded surface of the inflated tire, the first sidewall being generally opposite the second sidewall; (d) a first bead roller selectively contacting the first sidewall proximate a first bead of the inflated tire; and, (e) a second bead roller selectively contacting the second sidewall proximate a second bead of the inflated tire.

32 Claims, 13 Drawing Sheets

TIRE BEAD SEATING METHOD AND APPARATUS

CROSS REFERENCE TO RELATED APPLICATIONS

This application claims the benefit of U.S. Provisional Patent Application Ser. No. 61/314,065, filed Mar. 15, 2010, entitled "TIRE BEAD SEATING," the disclosure of which is incorporated herein by reference.

RELATED ART

1. Field of the Invention

The present disclosure is directed to machines for seating a tire bead on a wheel, and related methods for bead seating.

2. Brief Discussion of Related Art

Various methods and machines have been devised for seating the bead of a tire on a wheel. Generally, it may be desirable to ensure that the bead, or inner rim, of the tire aligns with and/or seats within the bead seat on the wheel to permit proper functioning of the wheel/tire assembly. Due to the substantial friction between the tire (which may be made of rubber) and the wheel (which may be made of metal), lubrication may be used to aid in mounting a tire on a wheel. For example, some methods may include soaping the tire and wheel, installing the tire on the wheel, inflating the tire at least partially, and manipulating the tire in some manner to get the tire bead to seat on the wheel completely around the diameter of the wheel. U.S. Pat. No. 6,557,610, which is incorporated by reference into this Background section, may be related to tire bead seating.

INTRODUCTION TO THE INVENTION

The present invention is directed to machines for seating a tire bead on a wheel, and related methods for bead seating.

It is a first aspect of the present invention to provide a tire bead seating apparatus for seating tire beads on a vehicle wheel, the apparatus comprising: (a) a repositionable arm operatively coupled to a rotatable drum, the repositionable arm directing the rotatable drum into selective engagement with an inflated tire mounted to a vehicle wheel, the rotatable drum operative to rotate when engaging the inflated tire to rotate the inflated tire and the vehicle wheel; (b) a first set of rollers selectively contacting a first peripheral surface of the inflated tire, the first peripheral surface bridging between a first sidewall and a treaded surface of the inflated tire; (c) a first set of rollers selectively contacting a second peripheral surface of the inflated tire, the second peripheral surface bridging between a second sidewall and the treaded surface of the inflated tire, the first sidewall being generally opposite the second sidewall; (d) a first bead roller selectively contacting the first sidewall proximate a first bead of the inflated tire; and, (e) a second bead roller selectively contacting the second sidewall proximate a second bead of the inflated tire.

In a more detailed embodiment of the first aspect, the repositionable arm comprises a plurality of repositionable arms, and each of the repositionable arms is coupled to a rotatable drum. In yet another more detailed embodiment, at least two of the rotatable drums selectively engage the inflated tire to rotate the inflated tire. In a further detailed embodiment, the apparatus farther comprises a repositionable rail conveyor that extends between the first set of rollers, the repositionable rail conveyor operative to deliver the inflated tire and vehicle wheel where both can be engaged by the rotatable drum, the repositionable rail conveyor repositionable between an elevated position that positions the inflated tire and vehicle wheel above the first set of rollers, and a retracted position that positions the inflated tire and vehicle wheel into contact with the first set of rollers. In still a further detailed embodiment, the first bead roller is rotationally mounted to a first repositionable shaft, the first repositionable shaft being pivotally mounted to a first chassis, and the second bead roller is rotationally mounted to a second repositionable shaft, the second repositionable shaft being pivotally mounted to a second chassis. In a more detailed embodiment, the first chassis is operatively coupled to a first pneumatic cylinder that repositions the first chassis within a first plane in a first direction and a second direction opposite the first direction, the second chassis is operatively coupled to a second pneumatic cylinder that repositions the second chassis within a second plane in a first direction and a second direction opposite the first direction, and the first plane is generally parallel to the second plane. In a more detailed embodiment, a first rotational axis extending axially through the first bead roller is acutely angled with respect to a first radial plane extending through the first sidewall at a location where the first bead roller contacts the first sidewall, and a second rotational axis extending axially through the second bead roller is acutely angled with respect to a second radial plane extending through the second sidewall at a location where the second bead roller contacts the second sidewall.

It is a second aspect of the present invention to provide a tire bead seating apparatus for seating tire beads on a vehicle wheel, the apparatus comprising: (a) a first bead roller selectively contacting a first sidewall of an inflated tire proximate a first bead, the inflated tire mounted to a vehicle wheel; (b) a second bead roller selectively contacting a second sidewall of the inflated tire proximate a second bead, the second sidewall and the first sidewall interposed by a tread section; and, (c) a tire rotator operative to rotate the inflated tire and vehicle wheel, where a contact area of the first bead roller is acutely angled with respect to a radius that extends through a first contact area of the inflated tire when the first bead roller contacts the first sidewall, and where a contact area of the second bead roller is acutely angled with respect to a radius that extends through a second contact area of the inflated tire when the second bead roller contacts the second sidewall.

In yet another more detailed embodiment of the second aspect, the first bead roller is rotationally mounted to a first repositionable shaft, the first repositionable shaft being pivotally mounted to a first chassis, and the second bead roller is rotationally mounted to a second repositionable shaft, the second repositionable shaft being pivotally mounted to a second chassis. In still another more detailed embodiment, the first chassis is operatively coupled to a first pneumatic cylinder that repositions the first chassis within a first plane in a first direction and a second direction opposite the first direction, the second chassis is operatively coupled to a second pneumatic cylinder that repositions the second chassis within a second plane in a first direction and a second direction opposite the first direction, and the first plane is generally parallel to the second plane. In a further detailed embodiment, a first rotational axis extending axially through the first bead roller is acutely angled with respect to a first radial plane extending through the first sidewall at a location where the first bead roller contacts the first sidewall, and a second rotational axis extending axially through the second bead roller is acutely angled with respect to a second radial plane extending through the second sidewall at a location where the second bead roller contacts the second sidewall. In still a further detailed embodiment, the first bead roller contacts the first sidewall at a first location, the second bead roller contacts the second sidewall at a second location, and the first location is positioned directly above the second location. In a more detailed embodiment, the apparatus further comprises a plurality of inclined rollers cooperating to form a tire bed, and a plurality of inclined roller cooperating to form a tire ceiling.

It is a third aspect of the present invention to provide a method of seating tire beads on a vehicle wheel, the method comprising: (a) rotating a vehicle wheel and a tire, the tire being mounted to the vehicle wheel and inflated; (b) applying pressure on a first sidewall of the tire proximate a first bead while the vehicle wheel and tire are rotating, where applying pressure on the first sidewall creates a gap between the first sidewall and the vehicle wheel and pulls the first sidewall radially outward with respect to the vehicle wheel; and, (c) applying pressure on a second sidewall of the tire proximate a second bead while the vehicle wheel and tire are rotating, where applying pressure on the second sidewall creates a gap between the second sidewall and the vehicle wheel and pulls the second sidewall radially outward with respect to the vehicle wheel.

It is a fourth aspect of the present invention to provide a method of seating tire beads on a vehicle wheel, the method comprising: (a) rotating a vehicle wheel and a tire, the tire being mounted to the vehicle wheel and inflated; (b) applying pressure on a first sidewall of the tire proximate a first bead while the vehicle wheel and tire are rotating; and, (c) applying pressure on a second side wall of the tire proximate a second bead while the vehicle wheel and tire are rotating.

In yet another more detailed embodiment of the fourth aspect, the pressure applied to the first sidewall of the tire proximate the first bead occurs simultaneously with the pressure applied to the second sidewall of the tire proximate the second bead. In still another more detailed embodiment, a first roller is used to apply the pressure to the first sidewall of the tire proximate the first bead, and a second roller is used to apply the pressure to the second sidewall of the tire proximate the second bead. In a further detailed embodiment, at least one of the first roller and the second roller is acutely angled with respect to at least one of the first bead and the second bead. In still a further detailed embodiment, the first roller is acutely angled with respect to the first bead, and the second roller is acutely angled with respect to the second bead. In a more detailed embodiment, the first bead roller contacts the first sidewall at a first location, the second bead roller contacts the second sidewall at a second location, and the first location is positioned directly above the second location. In a more detailed embodiment, the vehicle wheel and tire are horizontally rotated, the pressure applied on the first sidewall of the tire proximate the first bead comes from a first roller positioned above the vehicle wheel and tire, and the pressure applied on the second sidewall of the tire proximate the second bead comes from a second roller positioned below the vehicle wheel and tire. In another more detailed embodiment, the vehicle wheel and tire are rotated in excess of four hundred rotations per minute while the pressure is applied to the first and second sidewalls, the first roller is acutely angled with respect to the first bead, and the second roller is acutely angled with respect to the second bead.

DETAILED DESCRIPTION

The exemplary embodiments of the present invention are described and illustrated below to encompass machines for seating a tire bead on a wheel, and related methods for bead seating. Of course, it will be apparent to those of ordinary skill in the art that the preferred embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

Figure 1:
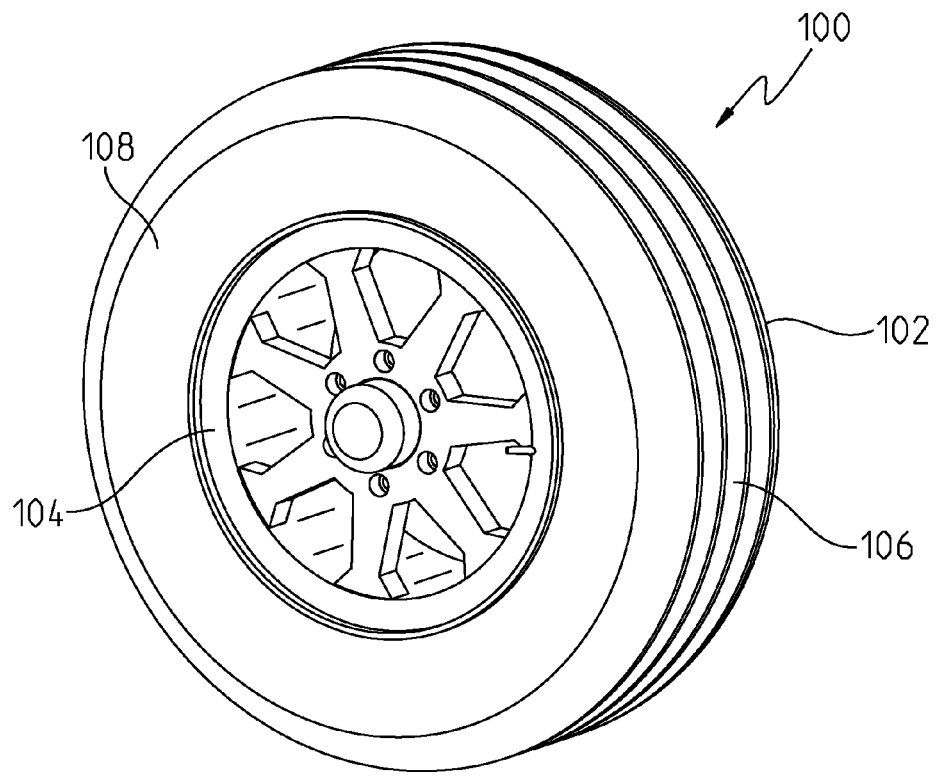
FIG. 1 is an elevated perspective view of a tire assembly.
Figure 2:
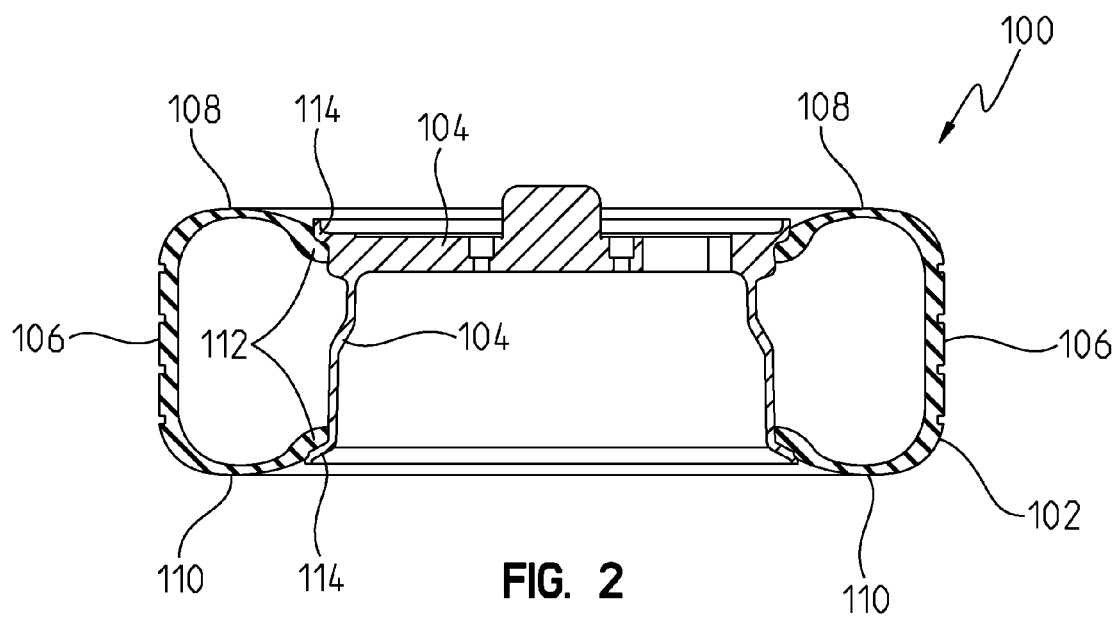
FIG. 2 is a horizontal cross-section of the exemplary tire assembly of FIG. 1.

Referencing FIGS. 1 and 2, an exemplary wheel assembly 100 includes a rubber tire 102 mounted to a vehicle wheel 104. In exemplary form, the tire 102 is inflated with air or nitrogen to a pressurized state well above atmospheric pressure to provide resistance to collapsing of the tire under a load. The tire 102 includes a tread section 106 that interposes right and left sidewalls 108, 110. An exposed circumferential edge of each sidewall 108, 110 includes a bead 112 that is correspondingly received by circumferential bead seats 114 of the vehicle wheel 104.

Figure 3:
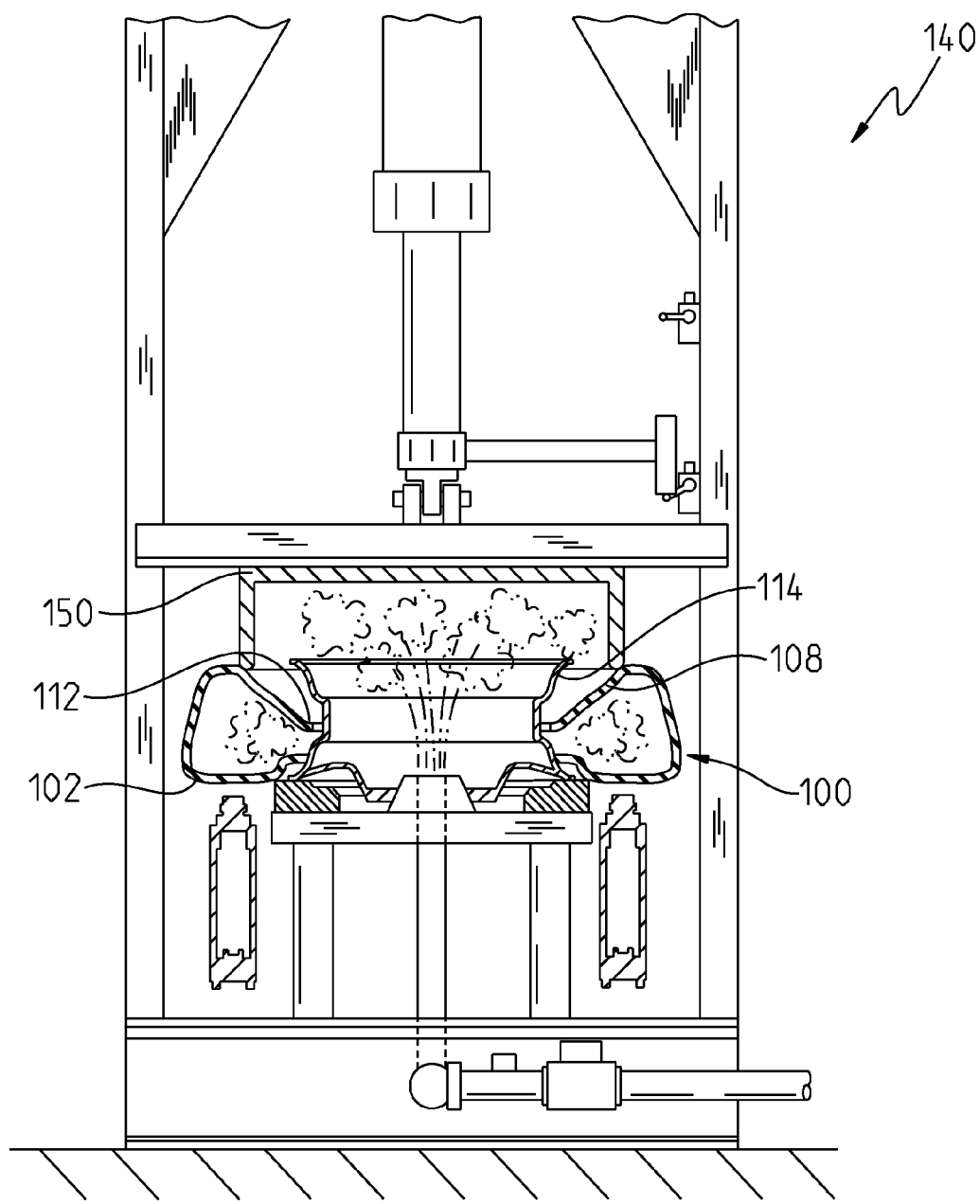
FIG. 3 is a profile view of an exemplary tire inflation station, showing a cross-section of the tire and how air is provided to inflate the tire.

Referring to FIG. 3, as is understood by those skilled in the art, a typical tire inflation station 140 conveys the wheel assembly 100 onto a stationary position beneath an overhead tire inflation head 150. Centering arms (not shown) may thereafter engage the tire 102 and center it with respect to the inflation head 150. The inflation head is then moved downwardly into engagement with one of the sidewalls 108, thereby displacing the bead 112 from the bead seat 114, and high pressure air is injected between the bead and bead seat 114 to inflate the tire 102. A more detailed explanation of this process and equipment is found in U.S. Pat. No. 4,947,919, the disclosure of which is incorporated herein by reference.

Figure 4:
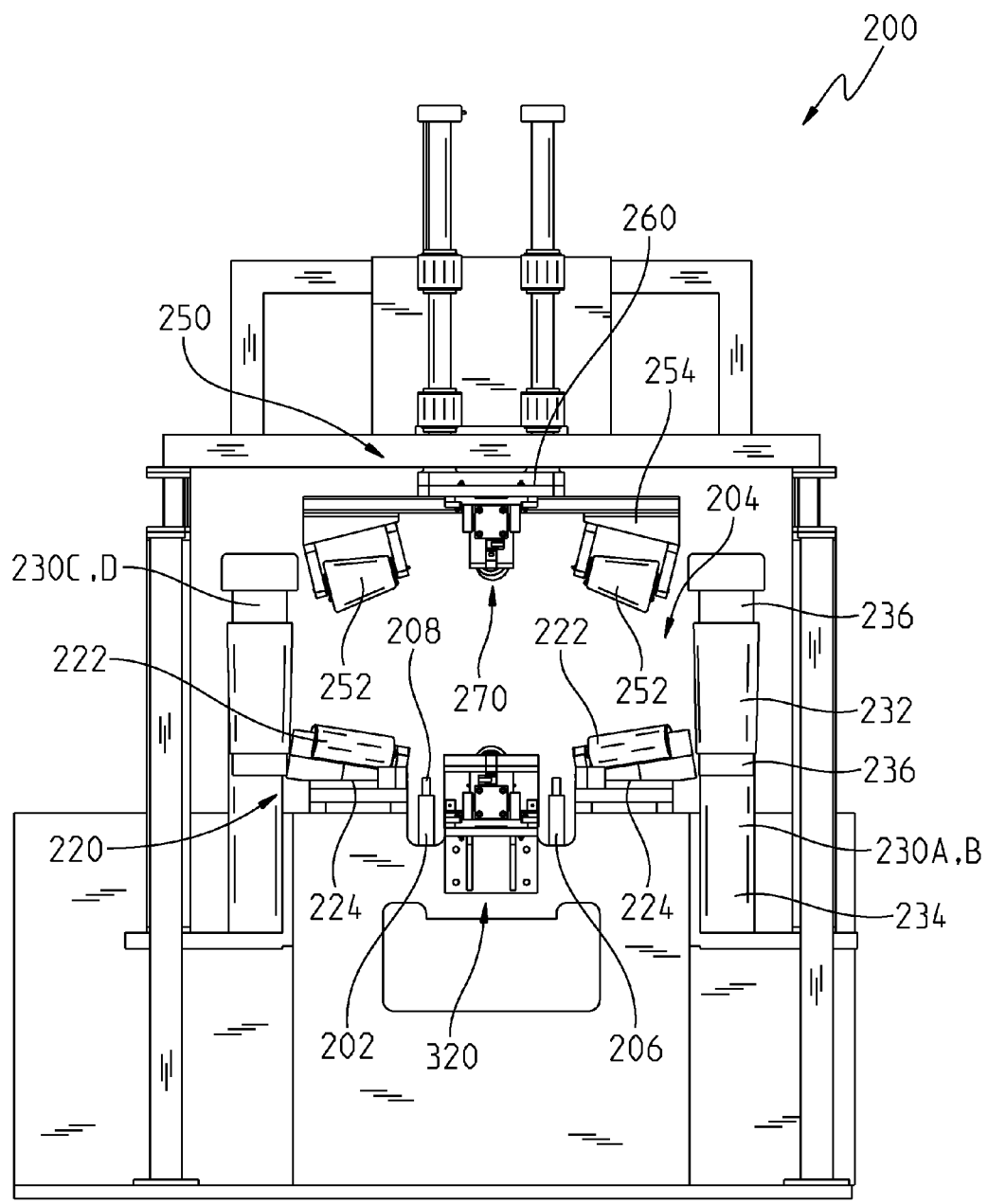
FIG. 4 is a frontal view of an exemplary tire bead seating machine in accordance with the instant disclosure.
Figure 5:
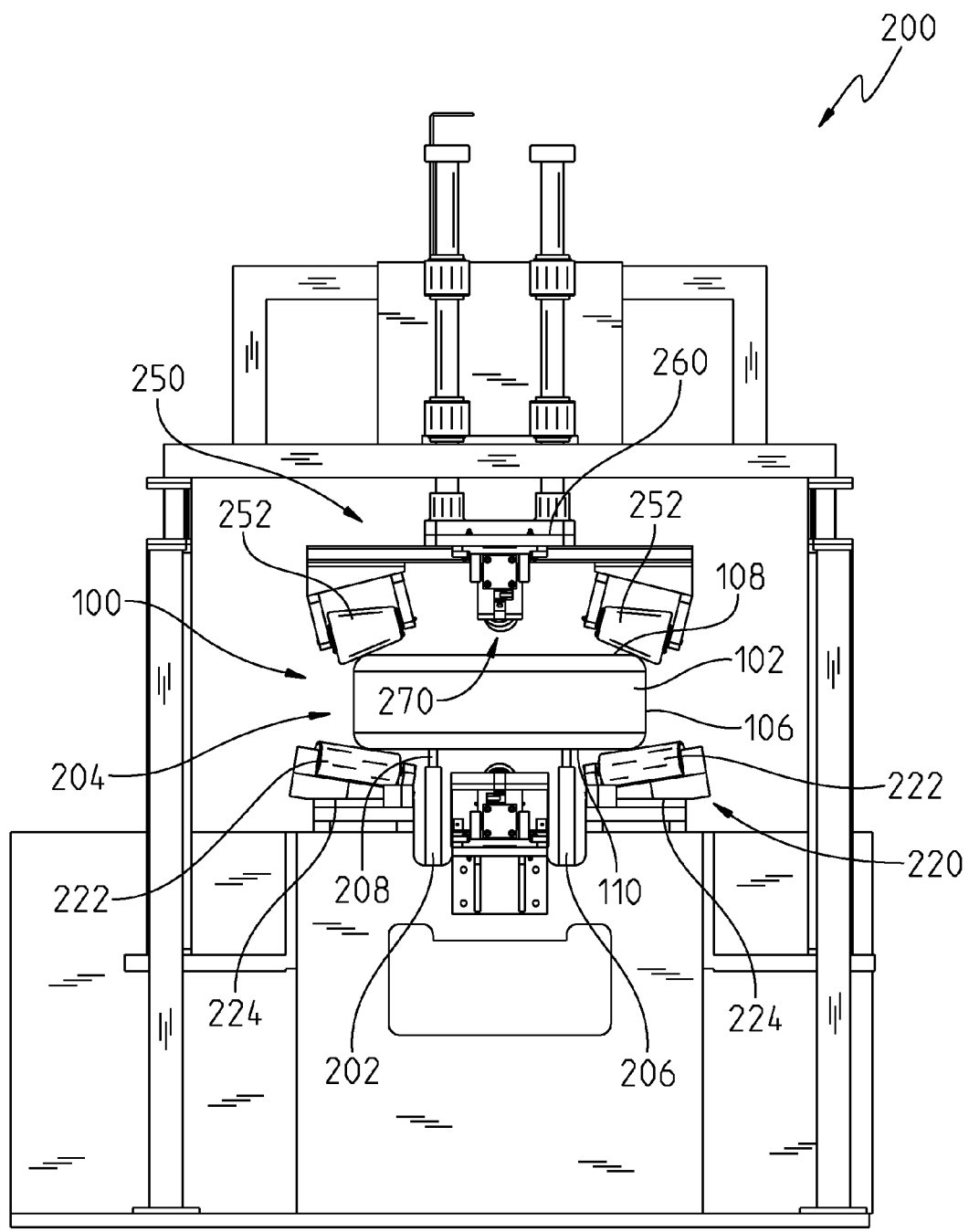
FIG. 5 is a frontal view of the exemplary tire bead seating machine of FIG. 4, shown with a tire positioned within the working area.

Referring to FIGS. 2, 4 and 5, an exemplary tire bead seating machine 200 is utilized to seat the tire 102 bead 112 of each sidewall 108, 110 with respect to the bead seat 114 of the vehicle wheel 104 after the tire has been inflated by the tire inflation station. By seating the bead 112, the machine 200 ensures that an adequate seal is formed between the bead 112 and bead seat 114 that may have otherwise been compromised by soap or other debris interposing the bead and bead seat resulting from the tire inflation process and mounting the tire 102 onto the wheel 104.

The machine 200 includes a conveyor 202 utilized to reposition the wheel assembly 100 into and out of a working area 204. In this exemplary embodiment, the conveyor 202 comprising a pair of spaced apart, parallel tracks 206 that each include a series of raised studs 208. The tracks 206 ride upon a guide wheels (not shown) and are operative to move forward or rearward. The raised studs 208 operate to engage the wheel assembly 100 and retain the wheel assembly on the conveyor 202 as the wheel assembly is moved into or out of the working area 204.

Within the working area 204, the machine 200 includes a lower wheel bed assembly 220, which includes a plurality of rollers 222 arranged to horizontally support the wheel assembly 100. In exemplary form, the rollers 222 comprise cylindrical rollers that are mounted to corresponding supports 224 that angle the rollers approximately five degrees from vertical and orient the rollers within a circular footprint of the wheel assembly 100. More specifically, the rollers 222 are generally oriented in parallel to respective radius of the wheel assembly 100. In this manner, the rollers 222 are adapted to contact an end of the lower sidewall 110 proximate the tread section 106.

The machine 200 also includes a plurality of drive roller assemblies 230 operative to selectively contact the tread section 102 of the wheel assembly 100 in order to rotate the wheel assembly while within the working area 204. In this circumstance, there are four drive roller assemblies 230A, 230B, 230C, 230D, with two on each side of the machine 200. It should be noted that each drive roller assembly 230 is substantially identical and accordingly only one drive roller assembly will be described in detail, with it being understood that the other assemblies are substantially identical in terms of construction and operation as described.

An exemplary drive roller assembly 230 includes a cylindrical roller 232 mounted at opposing ends to a repositionable frame 234. The repositionable frame 234 includes a block C-shaped section 236 with corresponding ends that receive corresponding ends of the cylindrical roller 232. A spindle (not shown) mounted to and extending through the roller 232 is received within respective ends of the C-shaped section 236. An end of the spindle is operatively coupled to a motor, such as an electric or hydraulic motor, that is operative to rotate the spindle thus rotate the roller 232. In particular, the motor drives the spindle, thus rotating the roller 232 that is in contact with the tread portion 106 of the tire 102. This rotation of the roller 232 causes the tire 102 to rotate about a central axis while being seated upon the drive roller assemblies 230.

In order to hold down the tire 102 while it is rotated by the drive roller assemblies 230, the machine also includes a hold-down assembly 250 that includes a plurality of hold-down rollers 252. In this exemplary embodiment, the hold-down assembly includes a pair of rollers 252 that are positioned opposite one another. It should be noted, however, that one or more than two rollers 252 may be utilized and oriented in any particular orientation. The hold-down assembly 250 is vertically repositionable to allow the hold-down rollers 252 to selectively engage an opposing sidewall 108 of the tire 102. In exemplary form, the hold-down rollers 252 comprise frustoconical rollers that are mounted to corresponding supports 254 that angle the rollers approximately fifteen degrees from vertical and orient the rollers within a circular footprint of the wheel assembly 100. More specifically, the rollers 252 are generally oriented in parallel to respective radius of the wheel assembly 100. In this manner, the rollers 252 are adapted to contact an end of the upper sidewall 108 proximate the tread section 106 and maintain engagement with the wheel assembly 100 while the wheel assembly is rotated.

Referring to FIGS. 4-10, in order to vertically reposition the hold-down rollers 252 and supports 254, a repositionable platform 260 is mounted to the supports. In exemplary form, the platform 260 comprises an elongated plate having a cross-member 262 to which the corresponding supports 254 and hold-down rollers 252 are mounted. A predominant dimension of the platform 260 runs perpendicular to the direction of the cross-member, with the cross member being offset from the center of the platform. In order to vertically reposition the platform 260, a pair of hydraulic or pneumatic cylinders 264 is mounted to a top side 266. The hydraulic cylinders 264 are operative to reposition the platform 260 between a retracted position (see FIG. 4) and a working (i.e., extended) position (see FIG. 7). In the retracted position, the hold-down rollers 252 are elevated above the working area 204. In contrast, when in the working position, the hold-down rollers 252 occupy a portion of the working area 204.

Figure 9:
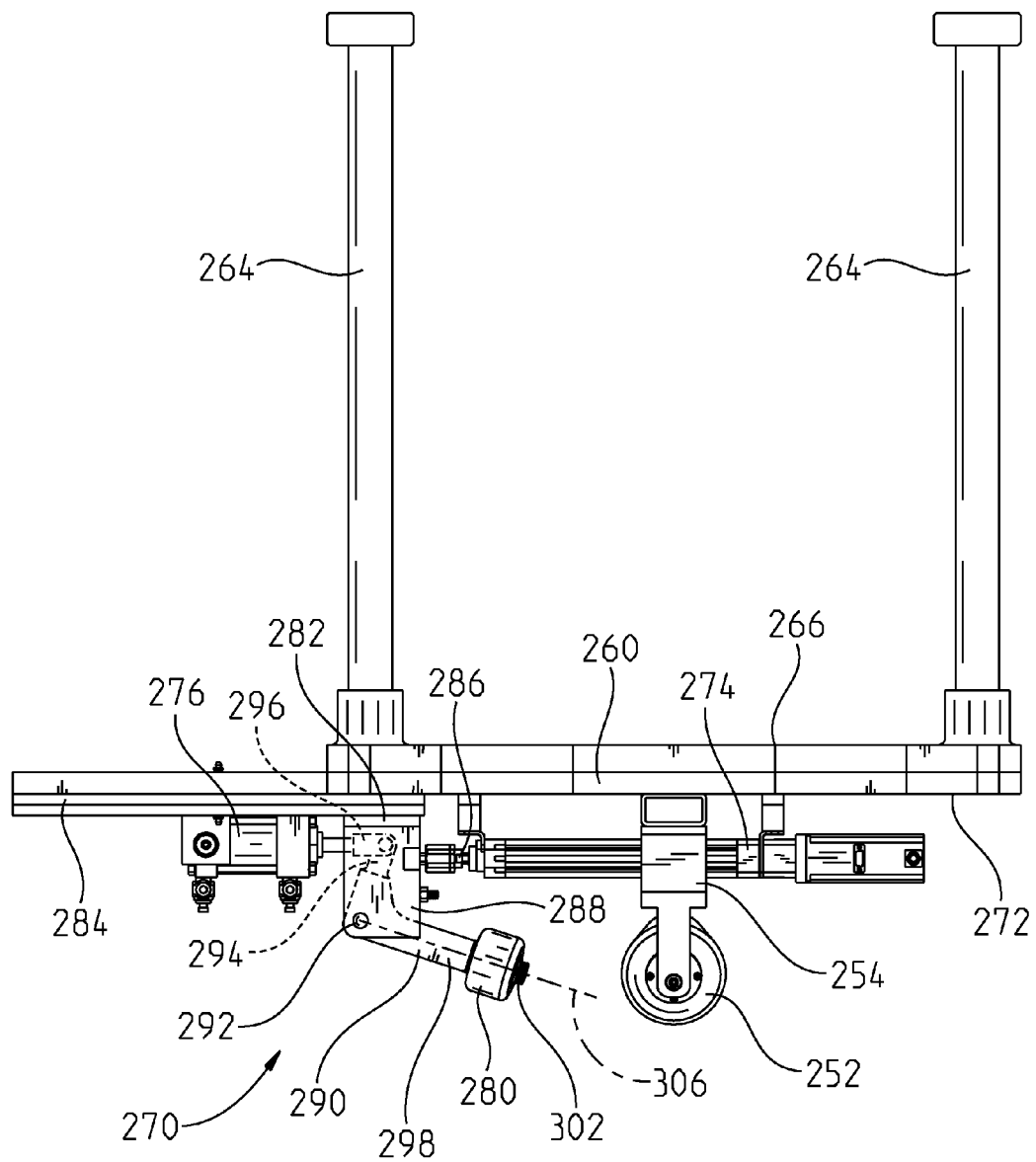
FIG. 9 is a right side profile view of the hold-down assembly and upper bead seating assembly shown in FIG. 8.
Figure 10:
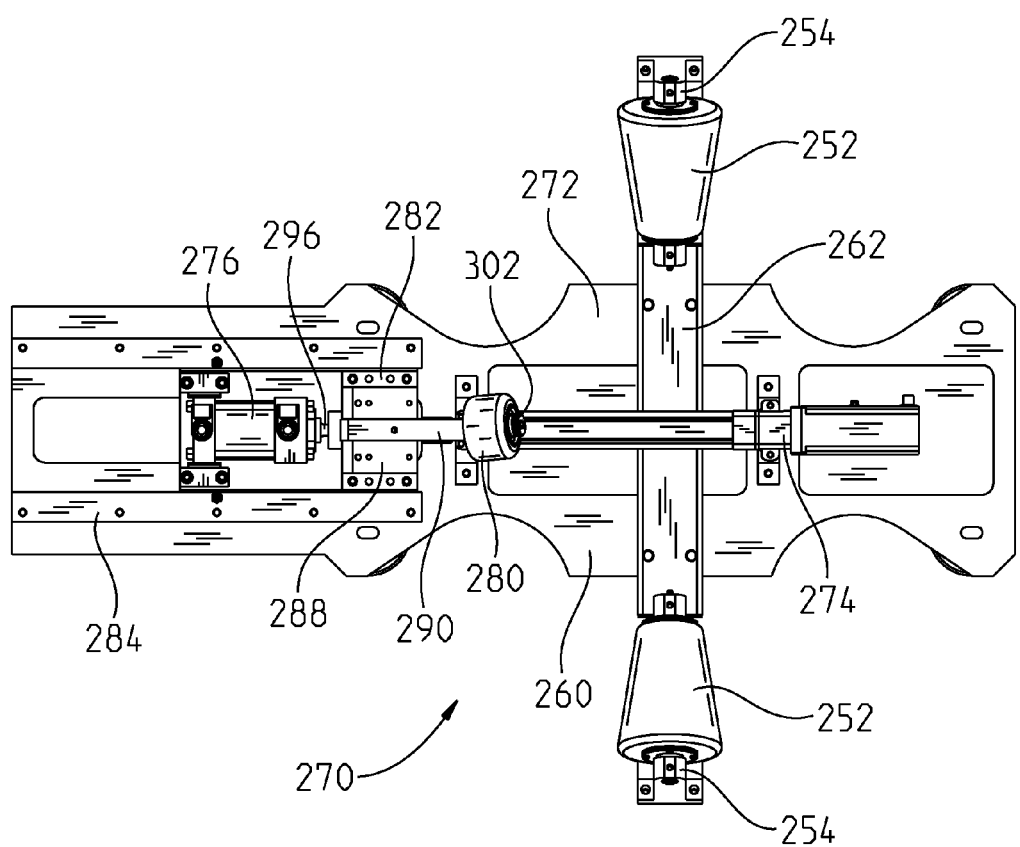
FIG. 10 is a bottom view of the hold-down assembly and upper bead seating assembly shown in FIG. 9.

Referring specifically to FIGS. 4, 9, and 10, an upper bead seating assembly 270 is also mounted to the repositionable platform 260. The upper bead seating assembly 270 is mounted on a bottom side 272, opposite the top side 266. In exemplary form, the upper bead seating assembly 270 includes a pair of pneumatic actuators 274, 276 operative to reposition an upper bead seating roller 280. Specifically, the first actuator 274 is mounted to the platform 260 and concurrently mounted to a repositionable carriage 282. The carriage 282 is laterally repositionable along a track 284 extending parallel to the dominant dimension of the platform 260. In other words, the mounting position of the first actuator 274 is fixed with respect to the platform and only a piston 286 of the first actuator is repositionable with respect to the platform. The piston is mounted to the repositionable carriage 282 and, thus, as the piston is repositioned (extended or contracted) laterally, so too is the carriage repositioned laterally.

The carriage 282 includes a block 288 having a through passage occupied partially by an L-shaped bracket 290 and a pin 292 that concurrently extends through the L-shaped bracket and a portion of the block. Specifically, the L-shaped bracket 290 is pivotally mounted to the block 288 and pivots around the pin 292. In contrast, the block 288 is mounted to the carriage 282 in a fixed orientation. A first end 294 of the L-shaped bracket 290 is mounted to a piston 296 of the second actuator 276, while a second end 298 of the L-shaped bracket is mounted to a spindle 302. As will be discussed in more detail hereafter, the spindle 302 is mounted to the second end 298 of the L-shaped bracket 290 in a non-perpendicular orientation. Specifically, the spindle 302 is angled at approximately five degrees with respect to a centerline 306 extending through the L-shaped bracket 290. It should be noted that the centerline 306 extending through the L-shaped bracket 290 is parallel to radius extending from the center of the tire 102 when the platform 260 is lowered to a working position. The other aspect of the second actuator 276 is fixedly mounted to the carriage 282, but the piston 296 is repositionable with respect to the carriage.

In sum, the first actuator 274 is operative to laterally reposition the carriage 282, while the second actuator 276 is operative to reposition the L-shaped bracket 290. Repositioning of the L-shaped bracket 290 is operative to reposition the upper bead seating roller 280, which is mounted to the spindle 302, between a retracted position (see FIG. 6) and a seating position (see FIG. 8). As will be discussed in more detail hereafter, in operation, the upper bead seating assembly 270 is operative to seat the bead 112 with respect to the bead seat 114 on one side of the wheel assembly 100. In order to seat the bead 112 with respect to the bead seat 114 on the opposite side of the wheel assembly 100, the machine 200 includes a lower bead seating assembly 320.

Figure 11:
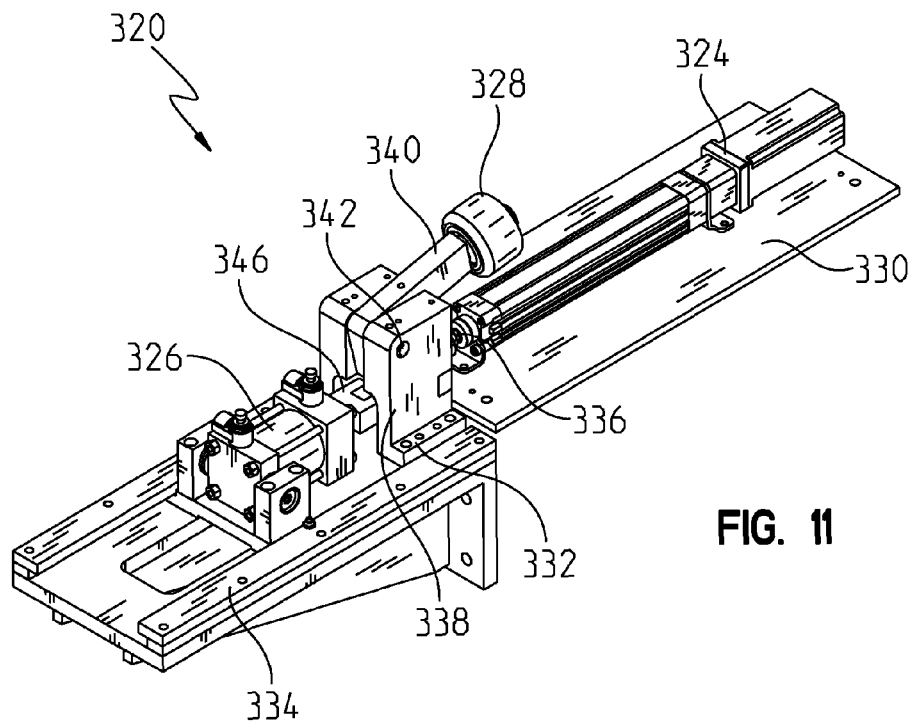
FIG. 11 is an elevated perspective view of the lower bead seating assembly shown in FIG. 4.
Figure 12:
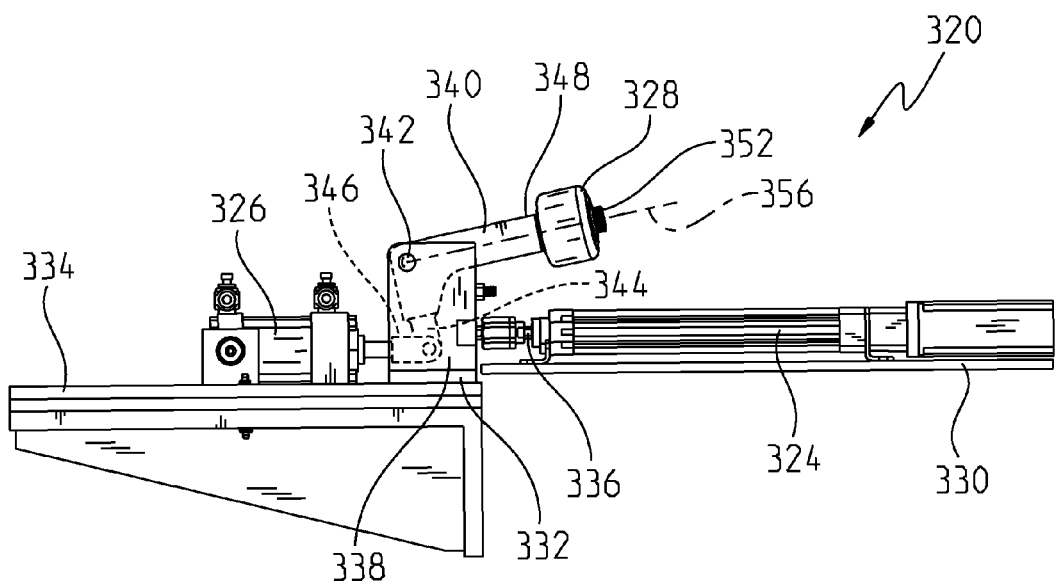
FIG. 12 is a right side profile view of the lower bead seating assembly shown in FIG. 11.

Referring specifically to FIGS. 4, 11, and 12, the lower bead seating assembly 320 is mounted to a frame of the machine laterally in-between the rollers 222. In exemplary form, the lower bead seating assembly 320 includes a pair of pneumatic actuators 324, 326 operative to reposition a lower bead seating roller 328. Specifically, the first actuator 324 is mounted to a fixed position platform 330 and concurrently mounted to a repositionable carriage 332. The carriage 332 is laterally repositionable along a track 334 extending parallel to the dominant dimension of the platform 330. In other words, the mounting position of the first actuator 324 is fixed with respect to the platform 330 and only a piston 336 of the first actuator is repositionable with respect to the platform. The piston 336 is mounted to the repositionable carriage 332 and, thus, as the piston is repositioned (extended or contracted) laterally, so too is the carriage repositioned laterally.

The carriage 332 includes a block 338 having a through passage occupied partially by an L-shaped bracket 340 and a pin 342 that concurrently extends through the L-shaped bracket and a portion of the block. Specifically, the L-shaped bracket 340 is pivotally mounted to the block 338 and pivots around the pin 342. In contrast, the block 338 is mounted to the carriage 332 in a fixed orientation. A first end 344 of the L-shaped bracket 340 is mounted to a piston 346 of the second actuator 326, while a second end 348 of the L-shaped bracket is mounted to a spindle 352. As will be discussed in more detail hereafter, the spindle 352 is mounted to the second end 348 of the L-shaped bracket 340 in a non-perpendicular orientation. Specifically, the spindle 352 is angled at approximately five degrees with respect to a centerline 356 extending through the L-shaped bracket 340. It should be noted that the centerline 356 extending through the L-shaped bracket 340 is parallel to radius extending from the center of the tire 102 when the L-shaped bracket 340 repositioned to a working position. The other aspect of the second actuator 326 is fixedly mounted to the carriage 332, but the piston 346 is repositionable with respect to the carriage.

In sum, the first actuator 324 is operative to laterally reposition the carriage 332, while the second actuator 326 is operative to reposition L-shaped bracket 340. Repositioning of the L-shaped bracket 340 is operative to reposition the lower bead seating roller 328, which is mounted to the spindle 352, between a retracted position (see FIG. 6) and a seating position (see FIG. 8). As will be discussed in more detail hereafter, in operation, the lower bead seating assembly 320 is operative to seat the bead 112 with respect to the bead seat 114 on the opposite side of the wheel assembly 100.

Figure 13:
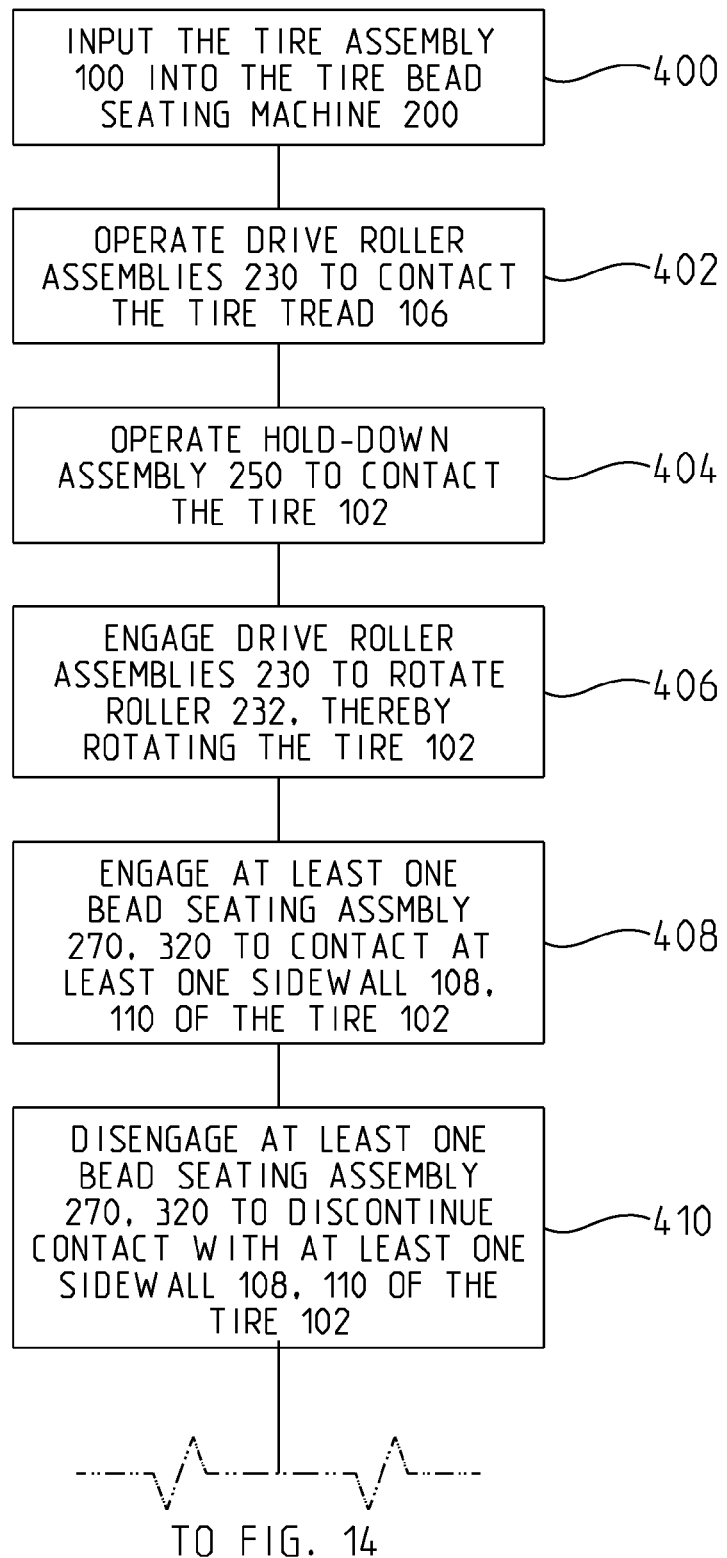
FIG. 13 is a first part of a process flow diagram.
Figure 14:
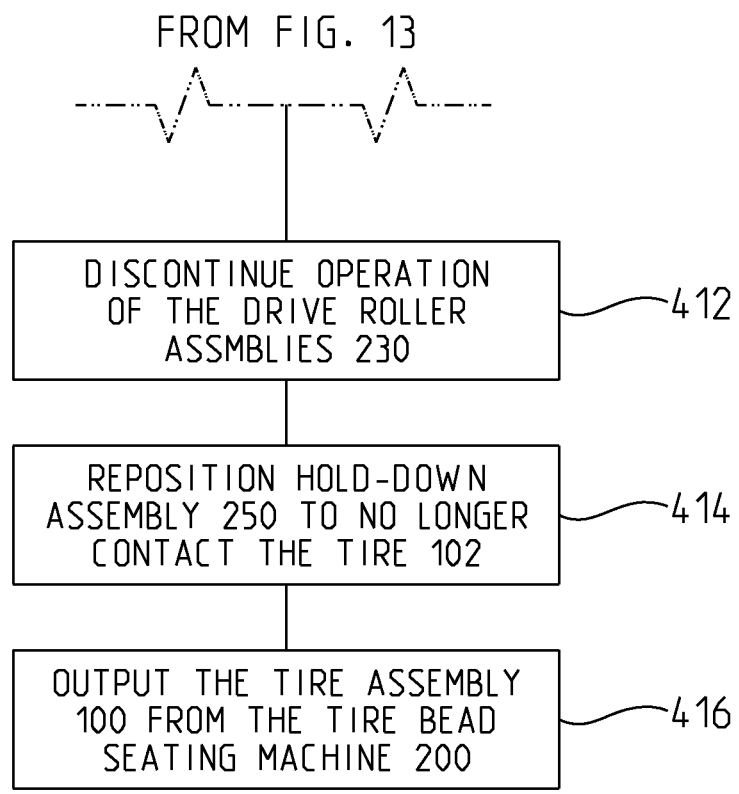
FIG. 14 is a second part of the process flow diagram of FIG. 13.

Referring generally to FIGS. 13 and 14, an example method of seating a bead using the tire bead seating machine 200 of the instant disclosure includes transferring a single wheel assembly 100 into the machine at step 400. As discussed briefly beforehand, the tire assembly 100 is positioned within the working area 204 of the machine 200 using the conveyor 202. Specifically, the wheel assembly 100 is positioned on a portion of the conveyor 202 and conveyed toward the working area 204.

Referring to FIGS. 5 and 13, just before reaching the edge of the forward most rollers 222, the studs 208 of the conveyor 202 are raised to elevate the wheel assembly 100 above the rollers 222, while continuing to move the wheel assembly into the working area 204. In this manner the wheel assembly 100 is elevated above the rollers and generally centered with respect to the rollers. Thereafter, the studs 208 of the conveyor 202 are lowered, resulting in one side of the tire 102 sitting upon the rollers 222.

At step 402, the drive roller assemblies 230A, 230B, 230C, 230D are repositioned from a non-contact position (see FIG. 4) to a contact position where the rollers 232 contact the tread portion 106 of the tire 102. In this exemplary embodiment, the drive roller assemblies 230A, 230B, 230C, 230D are equidistantly positioned about the circumference of the tire 102.

Figure 6:
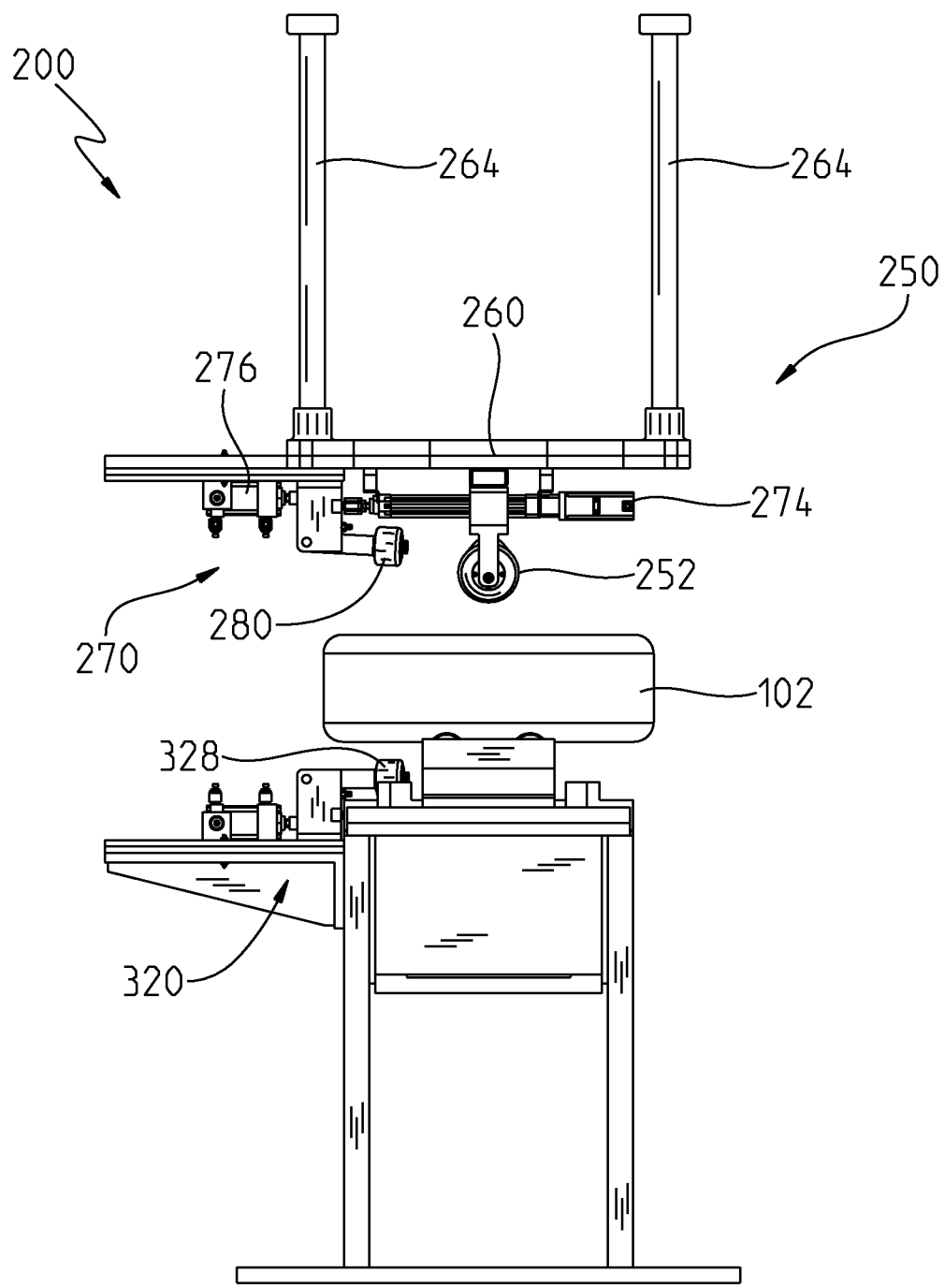
FIG. 6 is a right side profile view of the exemplary tire bead seating machine of FIG. 4.

Referencing FIGS. 6 and 13, at step 404, while the rollers 230 contact the circumference of the tire 102, the hold-down assembly 250 is lowered from a retracted position (see FIG. 4) to a working position (see FIG. 7) so that the hold-down rollers 252 contact the top circumferential edge between the sidewall 108 and the tread section 106.

At step 406, the drive roller assemblies 230A, 230B, 230C, 230D are engaged so that the rollers 232 rotate and correspondingly rotate the tire 102.

Figure 7:
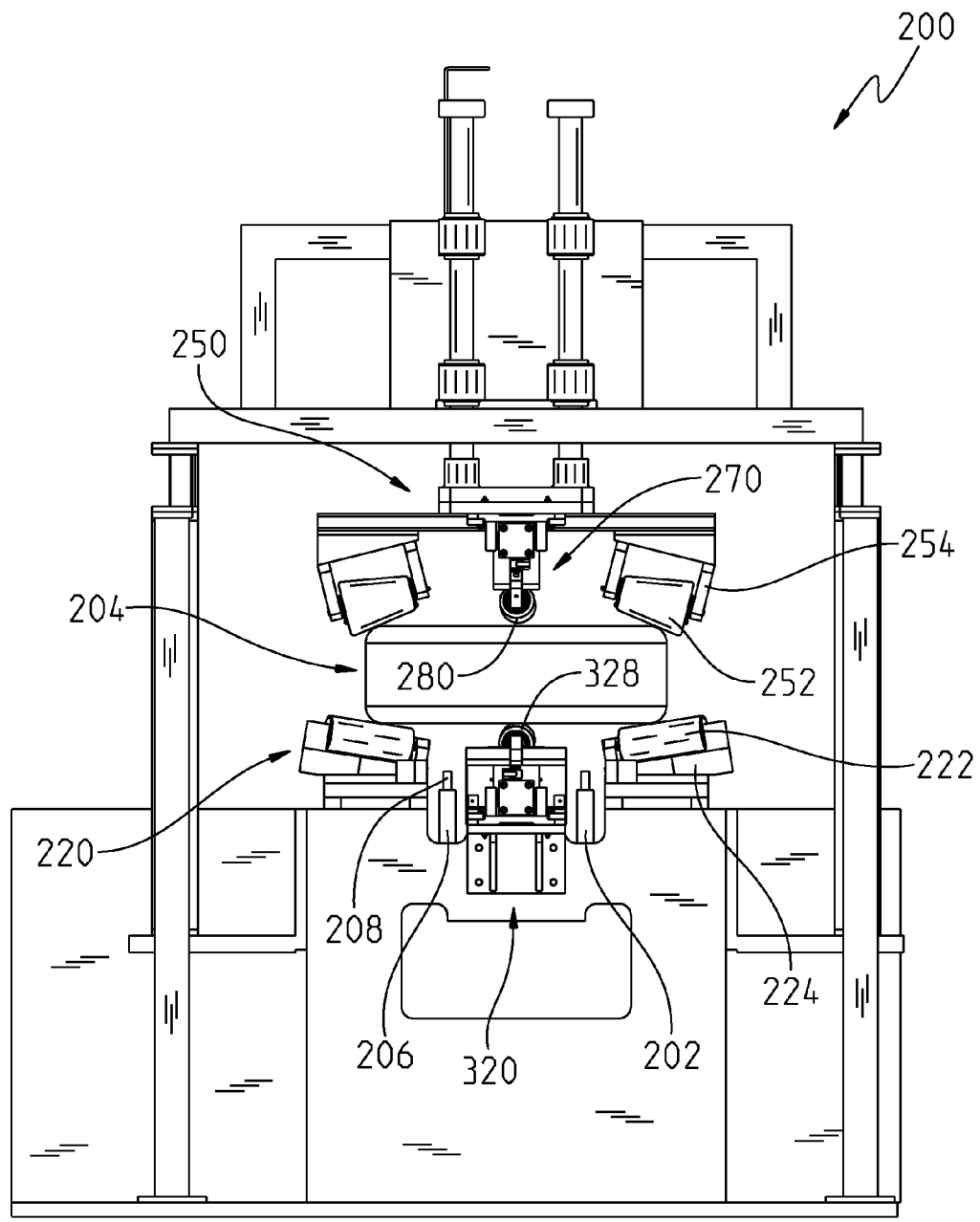
FIG. 7 is a frontal view of the exemplary tire bead seating machine of FIG. 4, shown with a tire positioned within the working area and the bead seating rollers contacting respective sidewalls of the tire.
Figure 8:
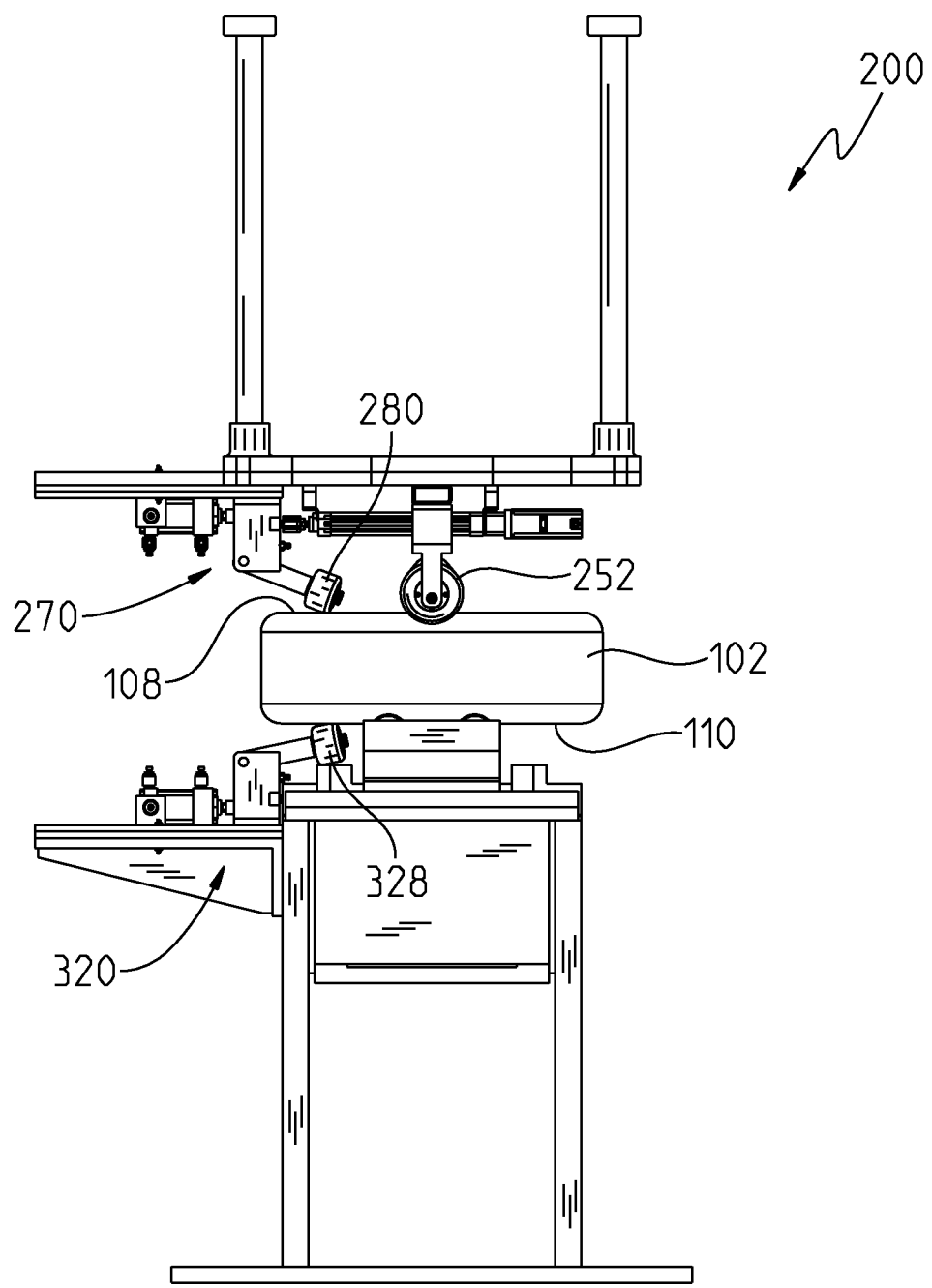
FIG. 8 is a right side profile view of the exemplary tire bead seating machine of FIG. 4, shown with a tire positioned within the working area and the bead seating rollers contacting respective sidewalls of the tire.

Referring to FIGS. 7, 8, and 13, at step 408 one or both of the bead seating assemblies 270, 320 are repositioned so that one or both bead seating rollers 280, 328 contacts a corresponding sidewall 1008, 110 of the tire 102. In this exemplary process, the bead seating assemblies 270, 320 are concurrently repositioned so that both bead seating rollers 280, 328 contact respective sidewalls 108, 110 of the tire 102 at the same time.

Figure 15:
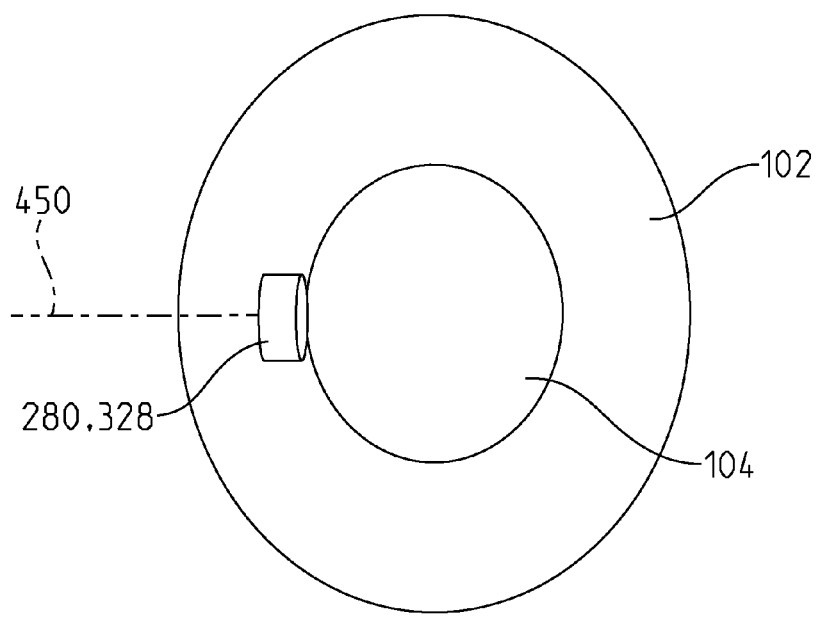
FIG. 15 is a graphical representation of an exemplary bead seat roller positioned with respect to a radius of a tire.

Referring to FIG. 15, an exemplary diagram shows the bead seating roller 280, 328 oriented coaxially with a radius 450 of the tire 102.

Figure 16:
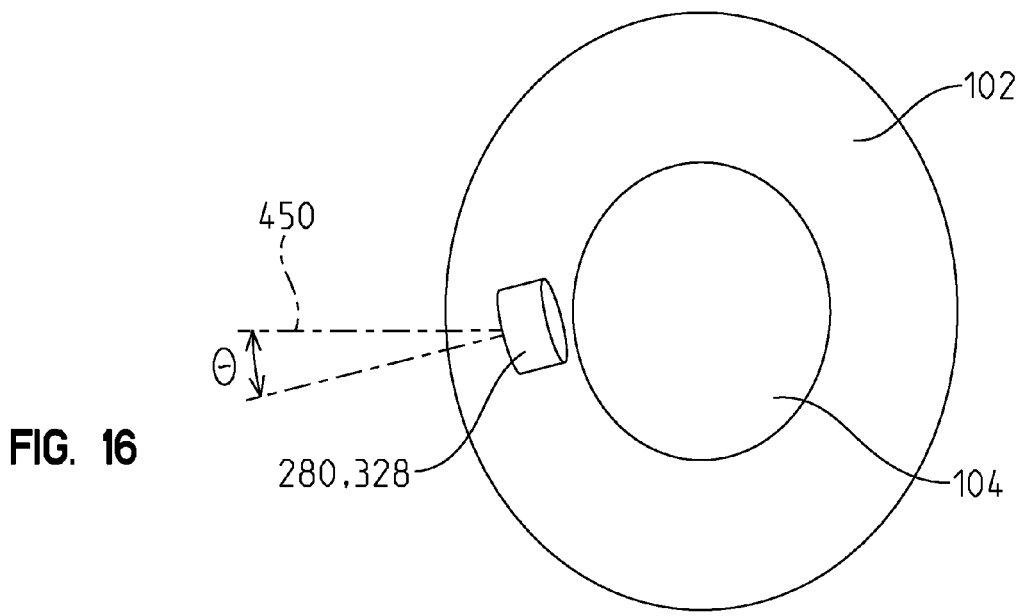
FIG. 16 is a graphical representation of an exemplary bead seat roller angled at an angle $\theta$ with respect to the radius of the tire.

Referring to FIG. 16, the exemplary method includes angling the bead seating roller 280, 328 with respect to the radius 450 of the tire 102 between an angle θ of two degrees to an angle of approximately forty-five degrees. In exemplary form, the bead seating roller 280, 328 is shown angled at approximately five degrees with respect to the radius 450.

Referring back to FIGS. 7, 8, and 13, by applying a positive force to a portion of the sidewalls 108, 110 in contact with the bead seating rollers 280, 328, a gap is temporarily created between the bead 112 and the bead seat 114. In this exemplary embodiment, the bead seating rollers 280, 328 engage respective sidewalls 108, 110 at about ¾" from the wheel flange and apply a pressure of about 150-265.10 lbf/sq. in. It should be noted, however, that other pressures may be used without departing from the scope of the disclosure. This gap is sufficiently large to allow trapped air in between the bead 112 and bead seat 114 to escape through the gap and displace any debris between the bead and the bead seat as a result of the rotational forces acting on the debris. But the gap is sufficiently small to inhibit significant deflation of the tire 102. After any debris is displaced, and the bead 112 again contacts the bead seat 114. This contact occurs after the respective portion of the sidewall is no longer in contact with the bead seating rollers 280, 328.

In this exemplary process, the wheel assembly 100 is rotated between approximately 200-1000 revolutions per minute for between approximately one to ten seconds. It should be noted, however, that other rates of rotation may be used and other durations of time may be utilized without departing from the scope of the disclosure.

Referring to FIGS. 5 and 13, at step 410, one or both of the bead seating assemblies 270, 320 are repositioned to discontinue contact between the one or both bead seating rollers 280, 328 and a corresponding sidewall 108, 110 of the tire 102. In sum, at the end of step 410, both bead seating assemblies 270, 320 no longer contact the tire 102.

Referring to FIGS. 5 and 14, at step 412, the drive roller assemblies 230A, 230B, 230C, 230D are disengaged. This includes first stopping the rotation of the rollers 232, followed by repositioning of the rollers to no longer contact any portion of the tire 102.

At step 414, the hold-down assembly 250 is raised from the working position (see FIG. 7) to the retracted position (see FIG. 4) to so that the hold-down rollers 252 no longer contact the top circumferential edge between the sidewall 108 and the tread section 106.

At step 416, the studs 208 of the conveyor 202 are raised to elevate the wheel assembly 100 above the rollers 222. Thereafter, the conveyor 202 removes the wheel assembly 100 from the working area 204 and conveys it along the conveyor. At this time, while the wheel assembly is positioned on the conveyor outside of the working area, a worker may exchange one wheel assembly 100 having completed the process for another wheel assembly needing to undergo the process. Thereafter, the foregoing process is repeated using steps 400-416.

While the machine has been described as a stand-alone piece of equipment, it should be understood that the machine 200 and components thereof may be utilized in an assembly line and/or may perform some or all of the operations discussed above in an automatic manner.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A tire bead seating apparatus for seating tire beads on a vehicle wheel, the apparatus comprising:
    a repositionable arm operatively coupled to a rotatable drum, the repositionable arm directing the rotatable drum into selective engagement with an inflated tire mounted to a vehicle wheel, the rotatable drum operative to rotate when engaging the inflated tire to rotate the inflated tire and the vehicle wheel;
    a first set of rollers selectively contacting a first peripheral surface of the inflated tire, the first peripheral surface bridging between a first sidewall and a treaded surface of the inflated tire;
    a second set of rollers selectively contacting a second peripheral surface of the inflated tire, the second peripheral surface bridging between a second sidewall and the treaded surface of the inflated tire, the first sidewall being generally opposite the second sidewall;
    a first bead roller selectively contacting the first sidewall proximate a first bead of the inflated tire; and,
    a second bead roller selectively contacting the second sidewall proximate a second bead of the inflated tire.

2. The tire bead seating apparatus of claim 1, wherein:
    the repositionable arm comprises a plurality of repositionable arms; and
    each of the repositionable arms is coupled to a rotatable drum.

3. The tire bead seating apparatus of claim 1, wherein at least two of the rotatable drums selectively engage the inflated tire to rotate the inflated tire.

4. The tire bead seating apparatus of claim 1, further comprising a repositionable rail conveyor that extends between the first set of rollers, the repositionable rail conveyor operative to deliver the inflated tire and vehicle wheel where both can be engaged by the rotatable drum, the repositionable rail conveyor repositionable between an elevated position that positions the inflated tire and vehicle wheel above the first set of rollers, and a retracted position that positions the inflated tire and vehicle wheel into contact with the first set of rollers.

5. The tire bead seating apparatus of claim 1, wherein:
    the first bead roller is rotationally mounted to a first repositionable shaft, the first repositionable shaft being pivotally mounted to a first chassis; and
    the second bead roller is rotationally mounted to a second repositionable shaft, the second repositionable shaft being pivotally mounted to a second chassis.

6. The tire bead seating apparatus of claim 5, wherein:
    the first chassis is operatively coupled to a first pneumatic cylinder that repositions the first chassis within a first plane in a first direction and a second direction opposite the first direction;
    the second chassis is operatively coupled to a second pneumatic cylinder that repositions the second chassis within a second plane in a first direction and a second direction opposite the first direction; and,
    the first plane is generally parallel to the second plane.

7. The tire bead seating apparatus of claim 1, wherein:
    a first rotational axis extending axially through the first bead roller is acutely angled with respect to a first radial plane extending through the first sidewall at a location where the first bead roller contacts the first sidewall; and,
    a second rotational axis extending axially through the second bead roller is acutely angled with respect to a second radial plane extending through the second sidewall at a location where the second bead roller contacts the second sidewall.

8. A tire bead seating apparatus for seating tire beads on a vehicle wheel, the apparatus comprising:
    a first bead roller selectively contacting a first sidewall of an inflated tire proximate a first bead, the inflated tire mounted to a vehicle wheel; and
    a second bead roller selectively contacting a second sidewall of the inflated tire proximate a second bead, the second sidewall and the first sidewall interposed by a tread section;
    a set of clamping rollers configured to be interposed by the inflated tire and clamp the inflated tire therebetween;
    a tire rotator operative to rotate the inflated tire and vehicle wheel;
    wherein at least one of the first bead roller and the second bead roller is independently repositionable with respect to the set of clamping rollers.

9. The tire bead seating apparatus of claim 8, wherein:
the first bead roller is rotationally mounted to a first repositionable shaft, the first repositionable shaft being pivotally mounted to a first chassis; and,
the second bead roller is rotationally mounted to a second repositionable shaft, the second repositionable shaft being pivotally mounted to a second chassis.

10. The tire bead seating apparatus of claim 9, wherein:
the first chassis is operatively coupled to a first pneumatic cylinder that repositions the first chassis within a first plane in a first direction and a second direction opposite the first direction;
the second chassis is operatively coupled to a second pneumatic cylinder that repositions the second chassis within a second plane in a first direction and a second direction opposite the first direction; and,
the first plane is generally parallel to the second plane.

11. The tire bead seating apparatus of claim 8, wherein:
a first rotational axis extending axially through the first bead roller is acutely angled with respect to a first radial plane extending through the first sidewall at a location where the first bead roller contacts the first sidewall; and,
a second rotational axis extending axially through the second bead roller is acutely angled with respect to a second radial plane extending through the second sidewall at a location where the second bead roller contacts the second sidewall.

12. The tire bead seating apparatus of claim 8, wherein:
the first bead roller contacts the first sidewall at a first location;
the second bead roller contacts the second sidewall at a second location; and,
the first location is positioned directly above the second location.

13. The tire bead seating apparatus of claim 8, wherein:
the clamping rollers include a plurality of inclined rollers cooperating to form a tire bed; and,
the clamping rollers include a plurality of inclined rollers cooperating to form a tire ceiling.

14. The tire bead seating apparatus of claim 8, wherein:
a contact area of the first bead roller is acutely angled with respect to a radius that extends through a first contact area of the inflated tire when the first bead roller contacts the first sidewall; and,
a contact area of the second bead roller is acutely angled with respect to a radius that extends through a second contact area of the inflated tire when the second bead roller contacts the second sidewall.

15. A method of seating tire beads on a vehicle wheel, the method comprising:
rotating a vehicle wheel and a tire, the tire being mounted to the vehicle wheel and inflated;
applying a first pressure on a first external sidewall of the tire while the vehicle wheel and tire are rotating and applying a second pressure on a second external sidewall of the tire while the vehicle wheel and tire are rotating to retain the rotating vehicle wheel and tire,
selectively applying a third pressure, different than the first pressure, on the first external sidewall of the tire proximate a first bead while the vehicle wheel and tire are rotating, where applying the third pressure on the first external sidewall creates a gap between the first external sidewall and the vehicle wheel and pulls the first external sidewall radially outward with respect to the vehicle wheel; and,
selectively applying a fourth pressure, different than the second pressure, on the second external sidewall of the tire proximate a second bead while the vehicle wheel and tire are rotating, where applying the fourth pressure on the second external sidewall creates a gap between the second external sidewall and the vehicle wheel and pulls the second external sidewall radially outward with respect to the vehicle wheel.

16. A method of seating tire beads on a vehicle wheel, the method comprising:
rotating a vehicle wheel and a tire, the tire being mounted to the vehicle wheel and inflated;
beginning to apply a first pressure on a first external sidewall of the tire proximate a first bead after the vehicle wheel and tire have been rotating; and,
beginning to apply a second pressure on a second external sidewall of the tire proximate a second bead after the vehicle wheel and tire have been rotating.

17. The method of claim 16, wherein the first pressure applied to the first external sidewall of the tire proximate the first bead occurs simultaneously with the second pressure applied to the second external sidewall of the tire proximate the second bead.

18. The method of claim 16, wherein:
a first roller is used to apply the first pressure to the first external sidewall of the tire proximate the first bead; and,
a second roller is used to apply the second pressure to the second external sidewall of the tire proximate the second bead.

19. The method of claim 18 wherein at least one of the first roller and the second roller is acutely angled with respect to at least one of the first bead and the second bead.

20. The method of claim 19, wherein:
the first roller is acutely angled with respect to the first bead; and,
the second roller is acutely angled with respect to the second bead.

21. The method of claim 18, wherein:
the first bead roller contacts the first external sidewall at a first location;
the second bead roller contacts the second external sidewall at a second location; and,
the first location is positioned directly above the second location.

22. The method of claim 16, wherein:
the vehicle wheel and tire are horizontally rotated;
the first pressure applied on the first external sidewall of the tire proximate the first bead comes from a first roller positioned above the vehicle wheel and tire; and,
the second pressure applied on the second external sidewall of the tire proximate the second bead comes from a second roller positioned below the vehicle wheel and tire.

23. The method of claim 22, wherein:
the vehicle wheel and tire are rotated in excess of four hundred rotations per minute while the first and second pressures are applied to the first and second external sidewalls;
the first roller is acutely angled with respect to the first bead; and,
the second roller is acutely angled with respect to the second bead.

24. A tire bead seating apparatus for seating tire beads on a vehicle wheel, the apparatus comprising:
a first plurality of rollers cooperating to form a tire bed;
a second plurality of rollers cooperating to form a tire ceiling;
a first bead roller selectively contacting a first sidewall of an inflated tire proximate a first bead independent of the first and second plurality of rollers, where the inflated tire is mounted to a vehicle wheel;

a tire rotator operative to rotate the inflated tire and vehicle wheel;

wherein a contact area of the first bead roller is acutely angled with respect to a radius that extends through a first contact area of the inflated tire when the first bead roller contacts the first sidewall.

25. The tire bead seating apparatus of claim 24, wherein the first bead roller is mounted to a first shaft repositionably mounted to a first chassis.

26. The tire bead seating apparatus of claim 25, wherein the first chassis is operatively coupled to a first pneumatic cylinder that repositions the first chassis within a first plane in a first direction and a second direction opposite the first direction.

27. The tire bead seating apparatus of claim 24, wherein a first rotational axis extending axially through the first bead roller is acutely angled with respect to a first radial plane extending through the first sidewall at the contact area where the first bead roller contacts the first sidewall.

28. The tire bead seating apparatus of claim 24, further comprising a second bead roller selectively contacting a second sidewall of the inflated tire proximate a second bead, the second sidewall and the first sidewall interposed by a tread section, wherein a contact area of the second bead roller is acutely angled with respect to a radius that extends through a second contact area of the inflated tire when the second bead roller contacts the second sidewall.

29. The tire bead seating apparatus of claim 28, wherein:
the first bead roller is mounted to a first shaft repositionably mounted to a first chassis; and,
the second bead roller is mounted to a second shaft repositionably mounted to a second chassis.

30. The tire bead seating apparatus of claim 29, wherein:
the first chassis is operatively coupled to a first device that repositions the first chassis within a first plane in a first direction and a second direction opposite the first direction;
the second chassis is operatively coupled to a second device that repositions the second chassis within a second plane in a first direction and a second direction opposite the first direction; and,
the first plane is generally parallel to the second plane.

31. The tire bead seating apparatus of claim 28, wherein:
a first rotational axis extending axially through the first bead roller is acutely angled with respect to a first radial plane extending through the first sidewall at the contact area where the first bead roller contacts the first sidewall; and,
a second rotational axis extending axially through the second bead roller is acutely angled with respect to a second radial plane extending through the second sidewall at the contact area where the second bead roller contacts the second sidewall.

32. The tire bead seating apparatus of claim 28, wherein the contact area of the first bead roller is positioned directly above the contact area of the second bead roller.

* * * * *